United States Patent
Bernard

(10) Patent No.: US 8,017,719 B2
(45) Date of Patent: Sep. 13, 2011

(54) METHOD FOR PREPARING POLYHYDROXY-URETHANES

(75) Inventor: Jean-Marie Bernard, Saint-Laurent d'Agny (FR)

(73) Assignee: Rhodia Operations, Aubervilliers Cedex (FR)

( * ) Notice: Subject to any disclaimer, the term of this patent is extended or adjusted under 35 U.S.C. 154(b) by 0 days.

(21) Appl. No.: 12/461,059

(22) Filed: Jul. 30, 2009

(65) Prior Publication Data

US 2009/0312502 A1    Dec. 17, 2009

Related U.S. Application Data

(63) Continuation of application No. PCT/FR2008/000115, filed on Jan. 31, 2008.

(30) Foreign Application Priority Data

Jan. 31, 2007  (FR) ..................... 07 00672

(51) Int. Cl.
*C08G 71/04* (2006.01)
*C08L 75/12* (2006.01)
*C09D 175/12* (2006.01)
*C07C 269/04* (2006.01)
*C09J 175/12* (2006.01)

(52) U.S. Cl. ......... 528/370; 528/422; 525/462; 525/470

(58) Field of Classification Search .................. 528/370; 560/115

See application file for complete search history.

(56) References Cited

U.S. PATENT DOCUMENTS

| 2,935,494 A | 5/1960 | Whelan et al. |
| 3,624,016 A | 11/1971 | Lew |
| 5,134,205 A | 7/1992 | Blank |
| 5,175,231 A | 12/1992 | Rappoport et al. |

FOREIGN PATENT DOCUMENTS

JP    2003183198 A  *  7/2003

OTHER PUBLICATIONS

Rokicki et al, Hyperbranched aliphatic polyethers obtained from environmentally benign monomer: glycerol carbonate, 2005, Green Chemistry, 7, 529-539.*
Ubaghs et al, Polyurethanes with Pendant Hydroxyl Groups: Synthesis and Characterization, Macromolecular Rapid Communications, 2004, 25, 517-521.*

* cited by examiner

*Primary Examiner* — Randy Gulakowski
*Assistant Examiner* — Rachel Kahn
(74) *Attorney, Agent, or Firm* — Buchanan Ingersoll & Rooney, P.C.

(57) ABSTRACT

The invention relates to a method for preparing polyhydroxy-urethanes without using a compound having an isocyanate function, and from amino compounds and compounds carrying carbonate functions, in particular cyclic carbonate functions. The invention also relates to a method for preparing aqueous or hydro-organic formulations containing polyhydroxy-urethanes, and to the use of said polyhydroxy-urethanes and of said aqueous or hydro-organic formulations.

28 Claims, No Drawings

METHOD FOR PREPARING POLYHYDROXY-URETHANES

CROSS-REFERENCE TO PRIORITY/PCT APPLICATIONS

This application claims priority under 35 U.S.C. §119 of FR 07/00672, filed Jan. 31, 2007, and is a continuation/national phase of PCT/FR 2008/000115, filed Jan. 31, 2008 and designating the United States (published in the French language on Sep. 12, 2008 as WO 2008/107568 A2; the title and abstract were also published in English), each hereby expressly incorporated by reference in its entirety and each assigned to the assignee hereof.

BACKGROUND OF THE INVENTION

Technical Field of the Invention

The present invention relates to novel methods of synthesizing functional polyurethanes without the use of isocyanate functional groups, to aqueous formulations comprising them, and to the production of coatings.

More particularly, the present invention relates to a novel method of obtaining functional polyurethane compounds carrying hydroxyl functional groups along the polymer chain, as well as to the use of the resulting polyurethanes in organic, aqueous and hydro-organic formulations, for the preparation of coatings.

Polyurethanes occupy a privileged position in the polymer field owing to both their nature and their applications. They are conventionally formed in the reaction from a diisocyanate and a compound having two functional groups with mobile hydrogen, principally hydroxyl groups, for example a diol. The choice of the starting materials, both of the diisocyanate and of the diol, is very wide and permits a wide variety of combinations, resulting in products having different properties and applications according to whether they possess hard or soft fragments, according to whether they are expanded or compact and/or have high mechanical characteristics.

A disadvantage of these polyurethanes is their method of synthesis, which involves the use of monomers having a plurality of toxic isocyanate functional groups. The production of polyurethanes therefore involves many chemical risks and is dangerous for operators.

Much research has been carried out to employ less harmful formulations. Accordingly, for several years, a novel strategy for synthesizing the urethane functional group has been studied. It has been found that the reaction from a diamine and a molecule having at least two cyclic carbonate functional groups results in the formation of polyurethane without the use of isocyanate compounds.

The latter are sometimes called NIPUs ("non-isocyanate polyurethanes") or polyhydroxy-urethanes owing to the formation of a hydroxyl (—OH) group in the β-position of the urethane functional group during the reaction.

Other methods of synthesizing polyurethanes without the use of isocyanate compounds employ transcarbamoylation reactions, as described, for example, in the works of Rokicki and Piotrowska (*Polymer*, 43, (2002), 2927-2935).

Polyhydroxy-urethanes are now conventionally obtained by polyaddition reaction from a compound having two cyclic carbonate functional groups and a diamine. The reaction from the diamine and the cyclic carbonate functional groups results, in a strictly organic medium, in the formation of a polyurethane carrying primary and/or secondary hydroxyl functional groups (Hidetoshi Tomita et al., *Journal of Polymer Science*, Part A: Polymer Chemistry, 39, (2001), 851-859).

As another example of a method employing cyclic carbonate groups with a diamine, U.S. Pat. No. 5,175,231 describes the formation of oligo-urethanes having terminal amine groups from a diamine and a compound having a plurality of cyclic carbonate groups, said cyclic carbonate groups being obtained from epoxy functional groups and carbon dioxide. The oligo-urethanes are then used in various reactions to form polyurethanes (PU).

WO 2006/010408 also describes the reaction from a compound carrying at least two cyclic carbonate groups and a compound carrying at least two amine functional groups to prepare a two-component adhesive.

It is therefore indisputably evident from the prior art that the current methods for preparing NIPUs require a compound carrying at least two cyclic carbonate groups, or cyclocarbonate. At present, there is no method for preparing polyhydroxy-urethanes which does not use isocyanate compounds and employs compounds carrying a single cyclic carbonate functional group, with a diamine or polyamine.

Accordingly, a first object of the present invention is to provide a method for preparing polyhydroxy-urethanes which does not use isocyanate compounds and uses products that are readily available commercially, and which has an economic advantage over the methods known from the prior art.

Another object is to provide a method for preparing very diverse polyhydroxy-urethanes without using isocyanate compounds.

Yet another object is to provide a method for preparing polyhydroxy-urethanes, without using isocyanate compounds, which have one or more hydroxyl (—OH) functional groups located in the β-position and/or γ-position of the urethane functional group.

As another object, the present invention proposes a method for preparing polyhydroxy-urethanes capable of reacting with other components to form crosslinked polymer compositions which can be used as coatings, adhesives, and others.

Another object is to propose aqueous formulations of polyhydroxy-urethanes obtained without the use of isocyanate compounds, as well as a method for preparing said formulations and their uses, especially for producing coatings, adhesives, and others.

Another object of the present invention is to provide simple methods of synthesizing polyfunctionalized compounds which can be used, for example, as surfactants and/or synthesis intermediates.

The present inventors have now found that those objects, and others which will become apparent from the description of the invention, can be achieved, wholly or partially, by virtue of the present invention which is described hereinbelow.

Accordingly, the present invention relates first to a method for preparing a compound, an oligomer or a polymer (U) having at least one urethane group and at least one hydroxyl (—OH) group, said method employing:

a) at least one compound (1) having a cyclic carbonate functional group and at least one hydroxyl (—OH) functional group, the oxygen atom of at least one hydroxyl functional group being bonded to the carbon atom of the carbonyl of said cyclic carbonate by from 3 to 5, preferably 3 or 4, atoms;

b) at least one compound (2) carrying at least one linear carbonate functional group;

c) at least one compound (3) carrying at least one primary or secondary amine functional group, preferably carrying at least two primary and/or secondary amine functional groups; and d) optionally at least one catalyst (4);

the compounds (1), (2), (3) and optionally the catalyst (4) taking part, simultaneously, in succession or in sequence, in a reaction, optionally in the presence of a solvent, to yield, optionally after removal of said solvent and/or of the co-products of the reaction, said compound, oligomer or polymer (U) having at least one urethane group and at least one hydroxyl (—OH) group.

The method of the invention has numerous advantages, especially in terms of operator safety since it uses products that are less toxic than isocyanates. The method also permits access to a wide range of functional polyurethanes which can be used in the coatings or adhesives field and which are of increased value for the production of aqueous polyhydroxy-urethane formulations.

Compound (1) is typically a cyclic carbonate carrying at least one hydroxyl functional group in the β- or γ-position of the carbonyl functional group. Such compounds are known to one skilled in the art and are readily available commercially or are readily prepared by known procedures available in the literature, in patents and patent applications, in "Chemical Abstracts" or on the internet.

As compounds (1) which can be used in the method of the invention there may be mentioned, for example, polyol carbonates, such as glycerol carbonate, trimethylolpropane carbonate, pentaerythritol carbonate and others, or sugar carbonates (carbon hydrates). When compound (1) has more than one hydroxyl functional group, it is preferable for the other hydroxyl functional group(s) to be protected, for example in carbamate, urethane, ester form, in dioxolane form or in another form.

Some compounds (1) are shown below:

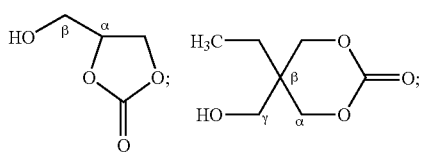

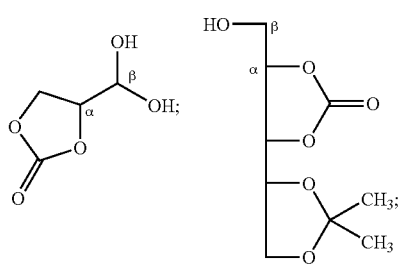

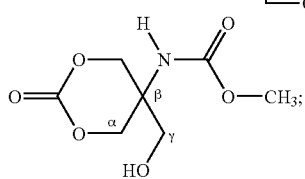

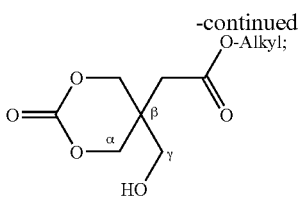

wherein "alkyl" represents a linear or branched alkyl chain having from 1 to 10 carbon atoms. Glycerol carbonate is a preferred compound (1) for the method of the present invention.

According to a variant, which represents a preferred aspect of the method of the invention, compound (1) can be present in the form of its precursor in the reaction mixture. The precursors (1') of compounds (1) are generally compounds having at least three hydroxyl functional groups, of which two are capable of forming the cyclic carbonate functional group of compound (1) and a third is located in the β- or γ-position of said carbonyl functional group capable of being formed.

The precursor (1') is converted into the compound (1), advantageously in situ, in the reaction mixture, under the action of a compound carrying a cyclic or linear carbonate functional group. According to a preferred variant, the compound (2), which carries a linear or branched carbonate functional group, permits the conversion of the precursor (1') into the compound (1).

The precursors (1') can be of any type known per se; examples which may be mentioned include ethane-1,1,2-triol (glycerol), 2,2-(dihydroxymethyl)butan-1-ol (trimethylolpropane), propane-1,2,3-triol, 2,2-(dihydroxymethyl)propane-1,3-diol, and the derivatives of trishydroxymethylaminomethane (the amine functional group of which is optionally and advantageously protected in amide, urethane or salt form, or in another form) and others. As precursors (1') there may also be mentioned sugars (carbon hydrates) and polyethers or polyesters functionalized by hydroxyl (—OH) functional groups.

Mixtures of one or more compounds (1) and/or one or more compounds (1') can also be used.

The compound (2) carrying at least one linear carbonate functional group is likewise of any type known per se and is readily obtainable commercially or readily prepared using known procedures available in the literature, in patents and patent applications, in "Chemical Abstracts" or on the internet. Preference is given to compounds (2) whose boiling point (b.p.) is from 80° C. to 280° C. at atmospheric pressure (760 mm Hg, or 1013.25 hPa).

According to an embodiment, compound (2) has at least one linear carbonate functional group of the general formula (a) below:

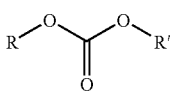

in which:

R and R', which are identical or different, each represents a linear or branched alkyl radical having from 1 to 6 carbon atoms, preferably methyl or ethyl, it being possible for each alkyl to be substituted by at least one cyclic carbonate, preferably by one cyclic carbonate.

As examples of compound (2) which can be used in the method of the invention there may be mentioned dimethyl carbonate (b.p.: 90° C.) and diethyl carbonate (b.p.: 126-128° C.), on their own or in mixtures.

It must be understood that one or more compounds (2) can be employed in the method of the present invention.

In the case where compound (2) has the formula (a), R and R' being as defined hereinbefore, and R and/or R' has (have) at least one cyclic carbonate group, compound (2) then has at least one linear carbonate group and at least one cyclic carbonate group. In that case, compound (2) acts as both compound (1) and compound (2) in the method of the invention; in other words, the presence of compound (1) is optional in said method.

Examples of such compounds (2) which allow the use of compound (1) to be omitted can be shown by the following structures, without implying any limitation:

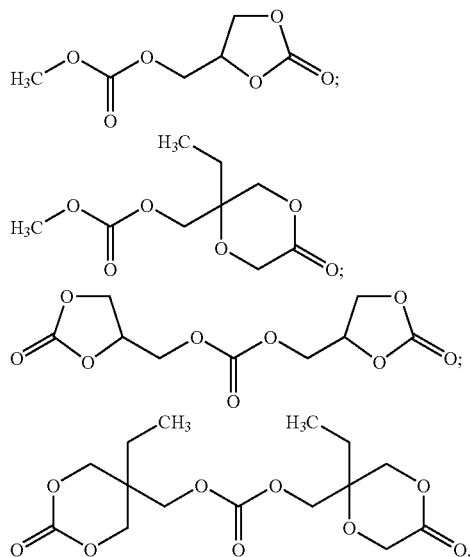

A very particularly interesting aspect of the present method is that the carbonate functional groups of compounds (1) and (2) have different reactivities. This allows block polyhydroxy-urethanes to be obtained by using a second or even a third compound (2) and/or a second or even a third compound (3).

When the method is carried out with more than one compound (2), for example with a second or even a third compound (2), said second and/or third compound (2) can be a compound carrying at least one cyclic carbonate functional group having 5 or 6 ring members, for example ethylene carbonate (b.p.: 243° C. at 740 mm Hg (98.66 kPa)) and propylene carbonate (b.p.: 240° C.), on their own or as mixtures.

Compounds (2) carrying only cyclic carbonate functional groups, and especially carrying at least two cyclic carbonate functional groups, are not preferred so as to avoid competition from the cyclic carbonate functional group(s) of the compound(s) (1) and the cyclic carbonate functional groups of the compound(s) (2).

In the method of the present invention, and however the method is carried out (simultaneously, in succession or in sequence), the total number of linear carbonate functional groups introduced into the reaction mixture by the compound(s) (2) must always be at least equal to the total number of cyclic carbonate functional groups introduced into the reaction mixture by the compound(s) (2) and/or the compound(s) (1). In other words, the method of the invention is carried out with a ratio (A) defined as follows:

$$(A) = \frac{\text{Total number of linear carbonate functional groups}}{\text{Total number of cyclic carbonate functional groups}} \geq 1.$$

Compound (3) has at least one primary or secondary amine functional group, preferably at least two primary and/or secondary amine functional groups, yet more preferably at least two primary amine functional groups. Compound (3) can be of any type known per se which is available commercially or is readily prepared by known procedures available in the literature, in patents and patent applications, in "Chemical Abstracts" or on the internet. The molar mass of compound (3) is generally from 60 to 5,000, preferably from 80 to 3,000.

In the case of primary amine functional group(s), preference is given to primary amine functional groups that are not very bulky, preferably those having a —$CH_2$— group in the α-position of the primary amine functional group.

According to a preferred aspect, compound (3) has one or more other groups, for example and in particular one or more ether, urethane, amide, hydroxyl, thiol or carboxyl functional groups, an ionic functional group (for example carboxylate, sulfonate, phosphate, phosphonate, quaternary ammonium) or a mixture of two or more of these groups.

As non-limiting examples of compounds (3) there may be mentioned:

primary or secondary monoamines, such as alkylamines, having a linear, branched or cyclic chain, optionally containing one or more unsaturated bonds, and having from 1 to 20 carbon atoms, for example butylamine, hexylamine, cyclohexylamine;

primary or secondary monoamines, such as alkylamines, having a linear, branched or cyclic chain, optionally containing one or more unsaturated bonds, and having from 1 to 20 carbon atoms, and having one or more ionic functional groups, for example selected from carboxylate, carbonate, sulfonate, phosphate, phosphonate, quaternary ammonium, and/or having one or more functional groups selected from —OH, —SH and ether;

polyether monoamines, especially amines with polymer chain(s) (alkylene oxide such as ethylene oxide and/or propylene oxide and/or butylene oxide and/or tetramethylene) which can also have one or more ionic functional groups, for example selected from carboxylate, carbonate, sulfonate, phosphate, phosphonate, quaternary ammonium, and/or one or more functional groups selected from —OH, —SH;

aliphatic or cycloaliphatic diamines, for example bis(aminopropyl)piperazine (marketed by Huntsman), aliphatic or cycloaliphatic diamines known generally as diisocyanate precursors, such as hexamethylenediamine (HMDA), isophoronediamine (IPDA), bis-(4,4'-aminocyclohexyl)methane ($H_{12}$MDA), tricyclodecanediamine (or 3(4), 8(9)-bis-(aminomethyl)tricyclo[5.2.1.10]decane marketed by Celanese); 2-methylpentane-1,5-diamine;

aromatic diamines known generally as diisocyanate precursors, for example toluenediamine, such aromatic diamines not being preferred, however;

diamines having ionic functional group(s), for example lysine and its salts, especially alkaline salts, for example sodium or quaternary ammonium salts;

oligomers and polymers having at least two amine functional groups, it being possible for the polymer skeleton to be a polyamide, a polyether, a polyester, a polyurethane or copolymers thereof.

According to an embodiment, compound (3) is selected from di-, tri- or tetra-functional polyether amines or polyoxyalkyleneamines, in which the alkylene structural unit, which is linear or branched, preferably contains 2, 3 or 4 carbon atoms, and mixtures thereof. Such polyether amines are, for example, those marketed by Huntsman under the trademarks Jeffamine™ and Elastamine™.

The method preferably employs one or more compounds (3), each advantageously having at least 2 amine functional groups. However, the invention does not exclude the use of monoamines as compound (3), as described hereinbefore. Like the di- or poly-amines defined hereinbefore, the monoamines can be of any type known per se, in particular monoamines of polymers or oligomers, polyamides, polyethers, polyesters, polyurethanes or copolymers thereof. Monoamines of interest are, for example, polyether monoamines, in particular those of the type known under the trademark Surfonamine™, marketed by Huntsman.

The solvent for the reaction of the method of the present invention is generally a solvent of the very polar type, and there may be mentioned by way of example methoxypropyl acetate (MPA), N-methylpyrrolidone (NMP) and dimethyl sulfoxide (DMSO), or alternatively a solvent of the alcohol type, for example methanol or ethanol, or alternatively a solvent of the acetal type, such as tetramethoxyethane, which is also called Highlink W (marketed by Clariant). Mixtures of one, two or more solvents can also be used.

It must be understood that compound (2) can act as the solvent for the reaction, in which case the use of another solvent is not required, although it is not excluded.

The method of the invention involves a plurality of successive reactions which can be carried out by a direct method, in a singe step ("one pot"), or by a method comprising successive steps or steps in sequence. The method can be conducted at atmospheric pressure or under pressure, especially if compound (2) has a boiling point below 150° C.

Accordingly, for example, the method of the invention can be carried out by bringing compound (1) into contact with compound (2) and then adding to the reaction mixture compound (3), optionally with the catalyst (4).

By way of variation, it is possible to bring compounds (1), (2) and (3) into contact and then optionally add the catalyst (4) and/or one or more compound(s) (2) and/or (3) which are identical with and/or different from the preceding compounds. According to another variant, the method is carried out in a single step by simultaneously bringing the totality of compounds (1), (2) and (3) into contact with the catalyst (4).

In the various possible methods of carrying out the method, as described hereinbefore, it must be understood that compound (1) can be replaced by its precursor (1'). Accordingly, the method of the invention can be carried out by bringing the precursor (1') into contact with compound (2) and then adding to the reaction mixture compound (3), optionally with the catalyst (4) and/or one or more compound(s) (2) and/or (3) which are identical with and/or different from the preceding compounds, or alternatively it is possible to bring the precursor (1') into contact with compounds (2) and (3) and then optionally add the catalyst (4), or alternatively the method can be carried out in a single step by simultaneously bringing the precursor (1') into contact with the totality of compounds (2) and (3) and the catalyst (4).

In each of these possibilities, and as indicated hereinbefore, the ratio (A) defined above must be such that (A)≧1.

In a general, purely illustrative and non-limiting manner, the overall reaction scheme of the method of the invention can be shown diagrammatically as follows:

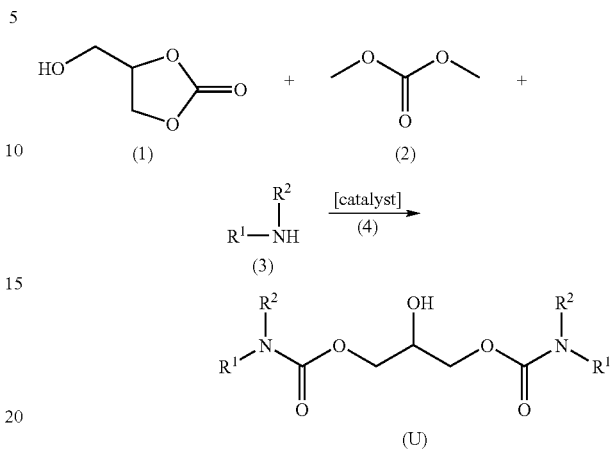

or alternatively, when the precursor (1') is used instead of compound (1):

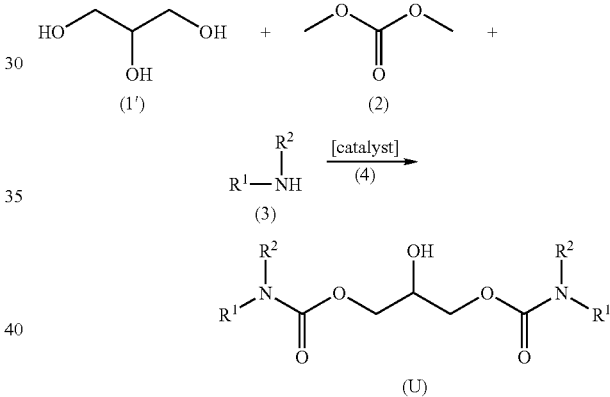

wherein $R^1R^2N$— represents the remainder of compound (3) after removal of a hydrogen atom of an amine functional group.

The successive reactions involved in the method of the present invention are described hereinbelow, in a purely illustrative and non-limiting manner:

i) in the presence of compound (2), compound (1) reacts with the amine compound (3) to yield, by opening the carbonate ring, a compound (B), or its isomer (B'), having at least one carbamate functional group and at least one hydroxyl functional group and preferably carrying two hydroxyl functional groups separated by an alkylene chain having two or three carbon atoms, optionally substituted:

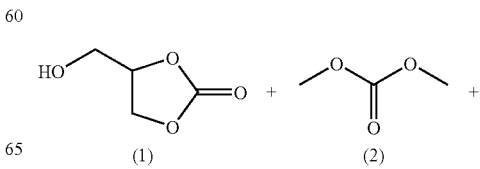

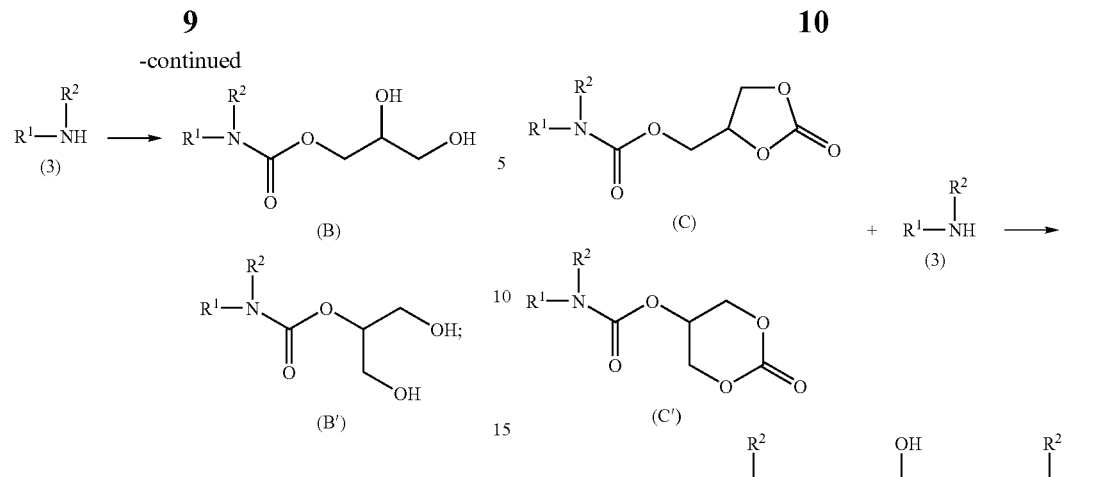

ii) compound (B) (and/or (B')) then reacts with the carbonate (2) present in the reaction mixture or freshly added to the reaction mixture (which compound is identical with or different from the first) to yield, by cyclization to cyclic carbonate, the compound (C) (and/or (C')) carrying at least one urethane functional group and at least one cyclic carbonate functional group having 5 or 6 carbon atoms:

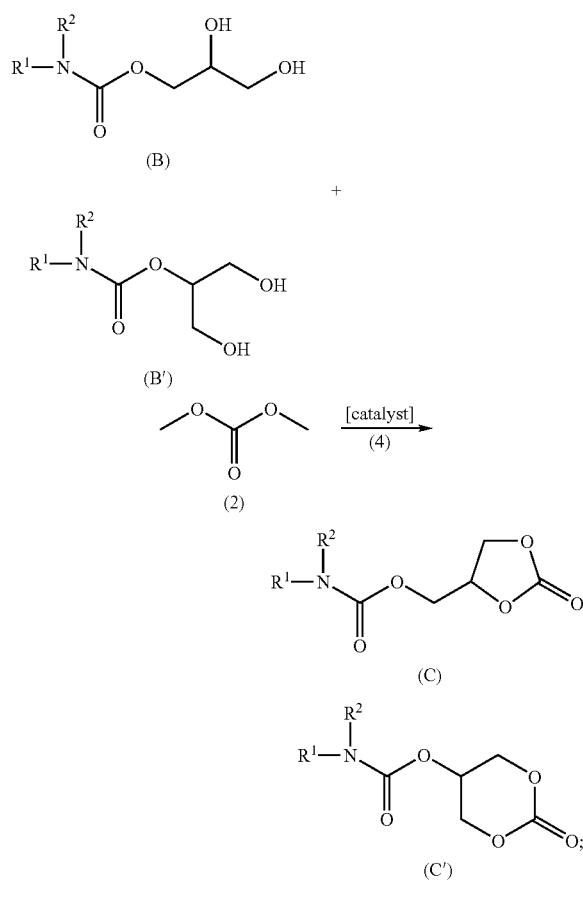

iii) in a final reaction, compound (C) (and/or (C')) can optionally react with the amine compound (3) present in the reaction mixture or freshly added to the reaction mixture (which amine compound is identical with or different from the first) to yield, by opening the carbonate ring, the compound U (and/or its isomer (U')) carrying hydroxyl group(s):

The entities (U) and (U'), which are isomers of one another, will conjointly be designated (U) in the present application.

Compounds B and B' having at least one carbamate functional group and at least one hydroxyl functional group, and an amine functional group, have structures that are typically representative of surfactant structures; the present invention accordingly relates to an alternative method for synthesizing surfactant compounds of structure B or B'.

The compound, oligomer or polymer (U) obtained by the method of the present invention has, as indicated hereinbefore, at least one urethane functional group and at least one hydroxyl functional group; said at least one hydroxyl functional group of the compound, oligomer or polymer (U) is preferably mostly situated along the chain, especially the polymer chain, in the β- or γ-position of said at least one urethane functional group, as indicated diagrammatically below:

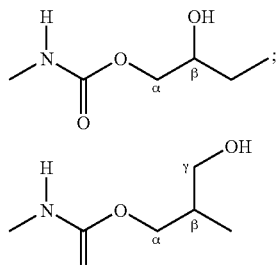

The molecular mass and the functionality of the final compound having urethane and hydroxyl functional group(s) ((U) and/or (U')) depend on the ratios of the various amine and carbonate functional groups employed in the method and are located within a wide range and depend on the applications which it is desired to develop.

Depending on the ratios of compounds (1), (2) and (3), the compound (U) (and/or its isomer (U')) will additionally carry hydroxyl and/or primary or secondary amine functional groups and/or will carry cyclic carbonate functional groups having 5 and/or 6 carbon atoms. The molar ratio of the amine functional groups/cyclic carbonate functional groups is generally from 0.1 to 10.

Step i) is illustrated more precisely by Example 1 below. Step ii) is illustrated more precisely by Example 2 below. Step iii) is illustrated more precisely especially by Example 15 below.

According to an above-mentioned variant, compound (1) can be prepared in situ, from its precursor (1') in the presence of the carbonate (2) according to the following scheme:

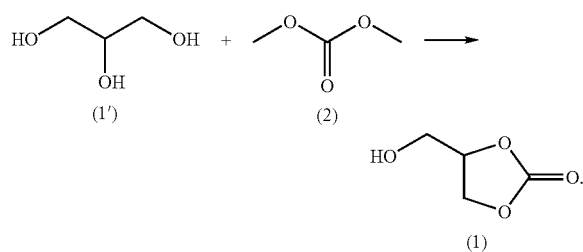

In the above reaction, two alcohol functional groups are consumed to form the cyclic carbonate (1). When the starting polyol contains more than two alcohol functional groups, that is to say 2+n alcohol functional groups, the resulting cyclic carbonate (1) then carries n alcohol functional groups. For example, in the above scheme, n is 1.

An aspect of the method, which represents an object of the present invention, is characterized by an intermediate reaction (reaction ii) above) of closure of a urethanediol ((B) or (B')), in which two hydroxyl functional groups are separated by two or three atoms, to give a cyclic carbonate urethane ((C) or (C')), in the presence of a carbonate (2) and optionally a catalyst. It must be noted that this "closure" step to form cyclic carbonate yields rings having 5 or 6 ring members.

The inventors have found, surprisingly, that closure of the carbonate ring can take place in very short times, at lower temperatures, and generally without a parasitic reaction with the urethane functional group, using various types of catalysts.

The use of a catalyst is not compulsory but has the advantage of accelerating the kinetics of the reaction and/or of operating at a lower temperature. The use of a catalyst, especially as defined hereinbelow, is preferred when compound (2) has the formula (a) defined hereinbefore and R and R' are identical or different and each represents a linear or branched alkyl radical having from 1 to 6 carbon atoms, preferably methyl or ethyl, and do not have a cyclic carbonate substituent.

As examples of catalysts suitable for the closure of the carbonate ring there may be mentioned the oxides, alkoxides or carboxylates of a metal selected from zinc, tin, zirconium, titanium and bismuth. There may also be mentioned as catalysts alkali metals and alkaline earth metals, alkali and alkaline earth hydroxides, carbonates and alkoxides, and their tertiary amine and quaternary ammonium salts.

More specifically, examples which may be mentioned are zinc stearate, zinc acetate, zinc 2,4-pentanedionate, tin octoate, dibutyltin dilaurate, dibutyltin oxide, titanium isopropanolate, and titanium butanolate.

As other types of catalysts there may also be mentioned Lewis acids and, among the Lewis acids, advantageously those which are stable in water, for example metal triflates such as bismuth triflate, rare earth triflate, or non-ionic strong bases, such as tertiary amines and bases of the phosphazene type.

According to a preferred embodiment, the ring closure reaction is greatly accelerated in the presence of bases of the phosphazene type, even when they are used in catalytic proportions. Furthermore, the use of such phosphazene-type bases permits closure of the carbonate ring at a lower temperature, thus avoiding any degradation of the product formed.

Phosphazene-type bases are known to be strong non-metallic, non-ionic and non-nucleophilic bases. As examples of phosphazene-type bases which can be used there may be mentioned, without implying any limitation, the following phosphazenes:

Phosphazene $P_1$-t-Bu ($C_{16}H_{33}N_4P$; molecular weight: 312.43, CAS RN: 16118-67-8, purity 97%);

Phosphazene $P_2$-t-Bu ($C_{14}H_{39}N_7P_2$, molecular weight: 367.45, CAS RN: 111324-03-9, for example in 2 mol/liter solution in tetrahydrofuran);

Phosphazene $P_2$-Et: $([(CH_3)_2N]_3P=NP(=NC_2H_5)[N(CH_3)_2]_2$, molecular weight: 339.40, CAS RN: 165535-45-5, purity 98%);

Phosphazene BTPP;

Phosphazene BEMP;

Phosphazene $P_1$-t-Oct.

All these phosphazenes are available commercially (see, for example, http://www.sigmaaldrich.com).

The Applicant has found, surprisingly, that two hydroxyl functional groups separated by two or three atoms can be cyclized to a cyclic carbonate functional group having 5 or 6 ring members, respectively, in the presence of a compound carrying at least one linear carbonate functional group (for example a compound (2) as defined hereinbefore) and a catalytic amount of at least one base of the phosphazene type.

The use of a base of the phosphazene type as catalyst for the carbonate ring closure reaction in compounds carrying at least two hydroxyl functional groups, said at least two hydroxyl functional groups being separated by two or three atoms, is novel and in that respect represents another aspect of the present invention.

The closure of a carbonate ring, in the presence of a catalytic amount of at least one base of the phosphazene type, is particularly suitable for substrates carrying at least one carbamate (urethane) functional group and at least two hydroxyl functional groups, said at least two hydroxyl functional groups being separated by two or three atoms, in particular for substrates which are compounds of type (B) or (B') defined hereinbefore.

The compounds (U) (and (U')) obtained according to the method of the present invention, and especially the polyhydroxy-urethanes, are used especially valuably in the form of compositions, in particular organic, aqueous or hydro-organic, preferably aqueous or hydro-organic, formulations, that is to say with at least one solvent and/or water, as components of coatings, adhesives and others, optionally with one or more curing agents, especially curing agents for polyurethanes known to one skilled in the art, for example polyisocyanate-based curing agents.

As mentioned hereinbefore, the hydroxyl (—OH) functional groups of the polyhydroxy-urethanes obtained according to the method of the present invention are preferably mostly situated along the polymer chain, in the β- or γ-position of the urethane functional groups.

The organic formulations of the polyhydroxy-urethanes of the invention can also be used in association with one or more conventional polyurethane(s) or conventional polyol(s), for example acrylic polyols or polyester polyols, in the production of coatings with curing agents, for example of the polyisocyanate type.

According to another aspect, the present invention relates also to a method for preparing polyhydroxy-urethane formulations in aqueous phase. "Formulations in aqueous phase" are understood as being solutions, suspensions, dispersions or emulsions in which the solvent can be purely aqueous or hydro-organic.

The aqueous polyhydroxy-urethane formulations according to the present invention can be obtained from compounds carrying at least one, preferably at least two, carbonate functional groups, of which at least one is cyclic, for example those obtained by the method of the invention, and denoted compound (C) (and/or (C')) described hereinbefore, and which are diurethane dicarbonates.

By way of variation, the aqueous formulations according to the invention can be obtained from compounds having at least one, preferably at least two, carbonate functional groups, at least one of which is cyclic and which are obtained according to conventional methods known to one skilled in the art.

As examples of compounds carrying at least one, preferably at least two, carbonate functional groups which can be used for the preparation of the aqueous formulations of the present invention there may be mentioned the following known compounds:

diglycerol dicarbonate;

pentaerythritol dicarbonate;

the diester of adipic acid and glycerol carbonate; and the addition products of a diisocyanate with glycerol carbonate.

As examples of compounds carrying at least one, preferably at least two, cyclic carbonate functional groups which can be used for the preparation of the aqueous formulations of the present invention there may be mentioned the following diurethanes, obtained according to the method of the present invention:

the diurethane of isophoronediamine (IPDA) and glycerol carbonate;

the diurethane of hexamethylenediamine (HDA) and glycerol carbonate;

the diurethane of tricyclodecanediamine and glycerol carbonate;

the diurethane of a polyether amine, for example Jeffamine™ XTJ 548, and glycerol carbonate; and the diurethane of bis-(4,4'-aminocyclohexyl)methane) ($H_{12}$MDA) and glycerol carbonate.

Yet other examples of compounds carrying at least one, preferably at least two, cyclic carbonate functional groups which can be used for the preparation of the aqueous formulations of the present invention are those having the following formulae:

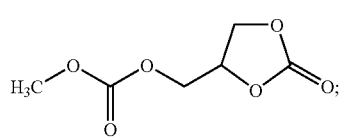

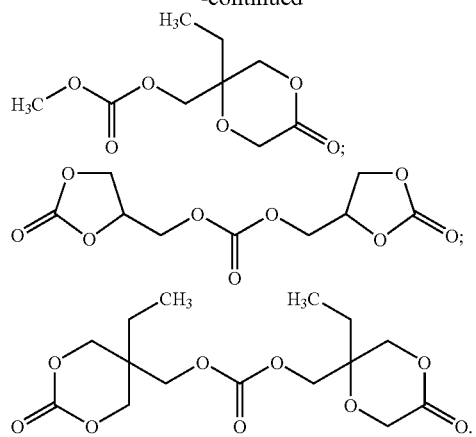

Accordingly, the method for preparing a polyhydroxy-urethane formulation in aqueous phase comprises the following steps:

1) reacting at least one compound carrying at least one, preferably at least two, carbonate functional groups, at least one of which is cyclic, and optionally at least one carbamate (urethane) functional group, for example a compound (2) or a compound (C) carrying cyclic carbonate functional group(s), as defined hereinbefore, with 2) at least one compound carrying at least two primary and/or secondary amine functional groups; and 3) optionally at least one compound carrying at least one primary and/or secondary amine functional group;

4) mixing the reagents, or the reaction product(s), in an aqueous phase, optionally containing an organic phase; and 5) obtaining an aqueous polyhydroxy-urethane formulation.

The compound having at least two primary and/or secondary amine functional groups, preferably at least two primary amine functional groups, can be of any type known per se having a molar mass of from 60 to 5,000, preferably from 80 to 3,000, and is available commercially or is readily prepared by known procedures which are available in the literature, in patents and patent applications, in "Chemical Abstracts" or on the internet. This compound is as defined hereinbefore in the definition of compound (3) above.

As non-limiting examples of a compound having at least two amine functional groups there may be mentioned:

aliphatic or cycloaliphatic diamines, for example bis(aminopropyl)piperazine (marketed by Huntsman);

aliphatic or cycloaliphatic diamines known generally as diisocyanate precursors, such as hexamethylenediamine (HMDA), isophoronediamine (IPDA), bis-(4,4'-aminocyclohexyl)methane ($H_{12}$MDA); tricyclodecanediamine (or 3(4), 8(9)-bis-(aminomethyl)tricyclo[5.2.1.10]decane marketed by Celanese);

aromatic diamines known generally as diisocyanate precursors, for example toluenediamine, such aromatic diamines not being preferred, however;

diamines having (an) ionic functional group(s), for example lysine and its salts, especially its alkali salts, for example sodium or quaternary ammonium salts;

oligomers and polymers having at least two amine functional groups, it being possible for the polymer skeleton to be a polyamide, a polyether, a polyester, a polyurethane or copolymers thereof.

According to an embodiment, the compound having at least two amine functional groups is selected from di-, tri- or tetra-functional polyether amines or polyoxyalkyleneamines in which the alkylene structural unit, which is linear or branched, preferably contains 2, 3 or 4 carbon atoms, and mixtures thereof. Such polyether amines are, for example, those marketed by Huntsman under the trademarks Jeffamine™ and Elastamine™.

The method for preparing aqueous polyhydroxy-urethane formulations likewise preferably uses at least one compound carrying at least one primary and/or secondary amine functional group, preferably uses at least one monoamine, for example those described in the definition of compound (3) above. Like the di- or poly-amines defined hereinbefore, the monoamines can be of any type known per se, in particular monoamines of polymers or oligomers, polyamides, polyethers, polyesters, polyurethanes or copolymers thereof.

There may be mentioned by way of example:

primary or secondary monoamines, such as alkylamines, having a linear, branched or cyclic chain, optionally containing one or more unsaturated bonds, and having from 1 to 20 carbon atoms, for example butylamine, hexylamine, cyclohexylamine;

primary or secondary monoamines, such as alkylamines, having a linear, branched or cyclic chain, optionally containing one or more unsaturated bonds, and having from 1 to 20 carbon atoms, and having one or more ionic functional groups, for example selected from carboxylate, carbonate, sulfonate, phosphate, phosphonate, quaternary ammonium, and/or having one or more functional groups selected from —OH, —SH and ether; and polyether monoamines, especially amines with polymer chain(s) (alkylene oxide such as ethylene oxide and/or propylene oxide and/or butylene oxide and/or tetramethylene) which can also have one or more ionic functional groups, for example selected from carboxylate, carbonate, sulfonate, phosphate, phosphonate, quaternary ammonium, and/or one or more functional groups selected from —OH, —SH.

Monoamines of interest are, for example, the polyether monoamines, and in particular those of the type known under the trademark Surfonamine™, marketed by Huntsman.

The present invention relates also to aqueous polyhydroxy-urethane formulations obtained according to the method described above, and especially aqueous polyhydroxy-urethane formulations obtained by using a compound (2) as defined hereinbefore and having at least one cyclic carbonate functional group.

As indicated hereinbefore, the hydroxyl (—OH) functional groups of the polyhydroxy-urethanes are preferably mostly situated along the polymer chain, in the β and/or γ-position of the urethane functional groups.

Wholly interesting and diverse applications can be envisaged with aqueous polyhydroxy-urethane formulations, especially the aqueous formulations of the present invention, advantageously as formulations for coatings, adhesives, and others.

In particular, the aqueous polyhydroxy-urethane formulations obtained according to the method of the present invention are used as coatings, especially when the curing agents for said polyhydroxy-urethanes are hydrophilic and/or water-dispersible polyisocyanates, for example those known under the trademark Rhodocoat®, marketed by the Applicant, or those known under the trademark Bayhydur®, marketed by Bayer.

The aqueous polyhydroxy-urethane formulations of the invention can also be used in association with conventional polyurethanes or conventional polyols, for example acrylic polyols or polyester polyols, or with aminoplastic resins, for example melamine resins, to produce coatings. Such associations are very interesting when used in aqueous or even hydro-organic phase, especially in the cosmetics field. In fact, because the polyhydroxy-urethanes have been prepared without the use of compounds having isocyanate functional groups, they do not have the toxicity associated with conventional polyurethanes prepared from isocyanates.

Depending on the type of amine (diamine or monoamine) used, the polyhydroxy-urethanes obtained can have one or more pendant lateral functional groups of the cyclic carbonate type which are generally situated in the β and/or γ-position of the urethane functional groups.

The various types of polyhydroxy-urethanes described above can carry terminal functional groups, such terminal functional groups being, for example, cyclic carbonate structural units, and/or hydroxyl (—OH) functional groups and/or primary or secondary or tertiary amine functional groups and/or carboxylic and/or sulfonic and/or phosphoric or phosphonic acid functional groups; these functional groups can be in acid form or in salt form and/or can comprise monoalkyl ether polyether chains, preferably on condition that the primary and secondary amine functional groups do not coexist with compounds having cyclic carbonate structural units.

The examples which follow are given purely by way of illustration and do not limit the scope of protection conferred by the claims accompanying the present description.

EXAMPLES

Catalysts of the phosphazene type are supplied by Fluka. The polyether amines used are supplied by Huntsman. Jeffamine™ XTJ 542 is a polyether diamine which contains a polytetramethylene glycol segment and the amine functional groups of which are bonded to that segment by a short propylene glycol ether chain. The structure is as follows:

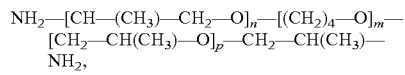

where n=3, m=9 and p=2.

The average molecular mass is approximately 1,000 g.

Jeffamine™ XTJ 548 (also denoted HT 1700) is a mixture composed of polyether diamines which contain a polytetramethylene glycol segment and the amine functional groups of which are bonded to that segment by a short tetramethylene chain, and of polyether triamines which contain two polytetramethylene glycol segments linked by a secondary amine functional group and the primary amine functional groups of which are bonded to the polytetramethylene segments by a short tetramethylene chain. The structure is as follows:

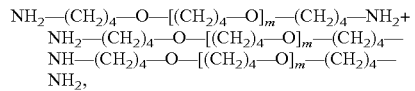

where m=approximately 12.

The average molecular mass is approximately 1700 g.

Example 1

Preparation of a Mixture of Glycerol N-n-Octylcarbamate 354 g of methoxypropyl acetate, 237 g (2 moles) of glycerol carbonate (Jeffsol GC from Huntsman; CAS RN: 931-40-8; molecular weight: 118.09) are introduced in succession, under nitrogen, into a three-necked flask equipped with a condenser and an addition funnel. The mixture is stirred at 230 revolutions per minute and heated to 70° C. Then 262.5 g (2.03 moles) of n-octylamine (CAS RN: 11-86-4; molecular weight: 129.25) are added to the reaction mixture in the course of 15 minutes. The reaction is strongly exothermic and the temperature of the reaction mixture reaches approximately 88° C.

Analysis of the reaction mixture by infra-red analysis immediately after the addition of the amine shows a pronounced reduction in the cyclic carbonate functional group (1780 cm$^{-1}$) with the appearance of the carbamate band at about 1730 cm$^{-1}$.

After 3 hours' reaction, the reaction mixture is cooled. Infra-red analysis shows the absence of a cyclic carbonate functional group (1790 cm$^{-1}$) and the formation of bands characteristic of urethane functional groups (—NH at 3346 cm$^{-1}$; —C═O at 1684 cm$^{-1}$; —CONH at 1535 cm$^{-1}$; and hydroxyl (3400 cm$^{-1}$).

The reaction mixture contains a mixture of the two carbamates N-n-octylcarbamate of 1,3-dihydroxypropan-2-ol ($C_8H_{17}$NH—C(═O)—O—CH—($CH_2$OH)$_2$) (32% by weight, given by NMR analysis) and N-n-octylcarbamate of 2,3-dihydroxypropan-1-ol ($C_8H_{17}$NH—C(═O)—O—$CH_2$—CHOH—$CH_2$OH) (68% by weight, given by NMR analysis). The concentration of the carbamate diols in the mixture is 58.5% by weight. The molecular weight of these carbamate diols is 247.3.

Proton NMR and carbon-13 analysis in CDCl$_3$ medium confirms the structure of the resulting compounds.

Carbamate functional groups:

Proton NMR: —NH at 5.35 and 5.2 ppm, —CH$_2$N at 3.05 ppm.

$^{13}$C NMR: 2 types of carbamates C═O at 157.0 ppm and 156.7 ppm.

Confirmation of the absence of carbonate functional groups:

Absence of a signal at 155-154 ppm.

The CHO and CH$_2$O signals of the glycerol group of the two carbamate species are confirmed by COSY NMR:

N-n-octylcarbamate of 1,3-dihydroxypropan-2-ol ($C_8H_{17}$NH—C(═O)—O—CH—($CH_2$OH)$_2$ CHO: 4.7 ppm ($^1$H NMR) and 75.7 ppm ($^{13}$C NMR);

CH$_2$O: 3.7 ppm ($^1$H NMR) and 63.1 ppm ($^{13}$C NMR).

N-n-octylcarbamate of 2,3-dihydroxypropan-1-ol ($C_8H_{17}$NH—C(═O)—O—CH$_2$—CHOH—CH$_2$OH)

—CH$_2$O—C(═O): 4.05 ppm ($^1$H NMR) and 62.2 ppm ($^{13}$C NMR);

—CHOH: 3.75 ppm ($^1$H NMR) and 70.5 ppm ($^{13}$C NMR);

—CH$_2$OH: 3.5 ppm ($^1$H NMR) and 65.6 ppm ($^{13}$C NMR).

Example 2

Cyclization of Octyl Urethanediols to N-Octylurethanes Carrying Cyclic Carbonate Functional Groups 50.2 g of the composition of Example 1 (i.e., 29.4 g of N-octylurethanediol, i.e., 0.119 mole) are placed in a stirred reactor. 8.5 g of methoxypropyl acetate (MPA) are added and the reaction mixture is stirred. 10.7 g of dimethyl carbonate (0.118 mole; CAS RN 616-38-6; molecular weight: 90.08) are added. After stirring, 0.31 g (0.001 mole) of pure phosphazene P$_1$-t-Bu (CAS RN: 81675-81-2) is added. The reaction mixture is heated at 100° C. for 4 hours of reaction and then the methanol is removed by distillation.

This synthesis was carried out with a molar ratio [basic phosphazene catalyst/urethanediol functional group] of 8.4 10$^{-3}$.

Infra-red analysis of the reaction mixture shows the presence:

of cyclic carbonate functional groups at 1785-1800 cm$^{-1}$; and of carbamate functional groups: NH at 3335 cm$^{-1}$, —CONH at 1540 cm$^{-1}$.

NMR analysis confirms:

the presence of the carbamate functional groups: NH at 5.1 ppm; CH$_2$N at 3.05; CH$_2$—O at 4.2; CHO at 4.8;

the presence of 6 C═O in $^{13}$C NMR from 157 and 154 ppm, demonstrating the formation of cyclic carbonate and carbamate functional groups; and the presence of ester functional groups of the solvent C═O at 170.6 ppm.

Examples 3 to 5

The synthesis of Example 2 is repeated using dilute solutions of phosphazene-based catalysts in hexane. Catalyst solutions comprising 2% by weight of phosphazene base in hexane are prepared from pure phosphazene catalysts or 2M solutions in tetrahydrofuran supplied by Fluka.

The catalyst solutions are then added to the reaction mixture in place of the pure basic phosphazene catalyst of Example 2. The results are shown in Table 1 below.

TABLE 1

| Ex. | Quantity Example 1 (g) | Quantity Example 1 (mole urethanediol) | Quantity MPA (g) | Quantity methyl carbonate (g) | Nature of catalyst | Quantity of catalyst (g) | Molar ratio catalyst/carbamate diol |
|---|---|---|---|---|---|---|---|
| 3 | 53.5 | 0.125 | 9 | 11.5 | P$_1$-t-Bu at 2% by wt. in hexane | 15.6 g of solution (0.31 g of pure catalyst) | 8 10$^{-3}$ |
| 4 | 53.5 | 0.125 | 9.5 | 11.4 | P$_2$-t-Bu at 2% by wt. in | 15.6 g of solution (0.3 g of | 6.5 10$^3$ |

TABLE 1-continued

| Ex. | Quantity Example 1 (g) | Quantity Example 1 (mole urethanediol) | Quantity MPA (g) | Quantity methyl carbonate (g) | Nature of catalyst | Quantity of catalyst (g) | Molar ratio catalyst/carbamate diol |
|---|---|---|---|---|---|---|---|
| 5 | 54.1 | 0.128 | 9.2 | 11.5 | hexane P$_2$-Et at 2% in hexane | pure catalyst) 15.9 g of solution (0.32 g of pure catalyst) | 7.4 10$^{-3}$ |

After 4 hours' reaction, the carbamate diols yield carbamates carrying cyclic carbonate functional groups with liberation of methanol.

The infra-red spectra and NMR analysis confirm the presence of urethane and cyclic carbonate functional groups.

The carbamates of octyl and glycerol carbonate are also confirmed by comparison with a sample prepared by reacting one equivalent of octyl isocyanate with one equivalent of glycerol carbonate (see Example 6); this method via an isocyanate does not form part of the invention.

Example 6

(Comparative/does not Form Part of the Invention): Synthesis of the Carbamate of Octyl and Glycerol Carbonate According to an Isocyanate Method 11 g of octyl isocyanate, 9.6 g of glycerol carbonate (Jeffsol GC from Huntsman) and 40 g of methoxypropyl acetate and 0.01 g of dibutyltin dilaurate are introduced in succession into a reactor. The reaction mixture is heated to 70° C.

After 5 hours' reaction, the isocyanate functional group has virtually disappeared.

The reaction mixture is cooled to ambient temperature. The product is analyzed by infra-red and proton NMR and $^{13}$C NMR after evaporation of the solvent using a rotary evaporator. After evaporation of the solvent, the product crystallizes.

Infra-red analysis confirms:

the absence of isocyanate functional groups;

the presence of carbonate functional groups (1781 cm$^{-1}$); and the presence of carbamate functional groups: NH at 3319 cm$^{-1}$, —C=O at 1684 cm$^{-1}$, CONH at 1540 cm$^{-1}$.

Proton NMR analysis confirms:

the presence of carbonate functional groups C=O at 154.9 ppm ($^{13}$C NMR);

the presence of carbamate functional groups:

$^1$H NMR: NH at 5.1 ppm and 4.85 ppm; CH$_2$—N at 3.05 ppm;

$^{13}$C NMR: —C=O at 155.6 and 155.4 ppm; and the glycerol structural units:

$^1$H NMR: CH$_2$—O at 4.2 ppm; CHO at 4.8 ppm;

$^{13}$C NMR: CHO: 74.4 ppm; CH$_2$O of the ring 63.2 ppm; and —CH$_2$O bonded to the carbamate functional group: 65.9 ppm.

Example 7

Synthesis of a Mixture of Diurethanes of Isophoronediamine and a Molecule Carrying Cyclic Carbonate Functional Groups, by a Non-Isocyanate Method 27.7 g (0.235 mole) of glycerol carbonate (Jeffsol GC from Huntsman) and 52.9 g of dimethyl carbonate are introduced in succession, under an inert atmosphere, into a three-necked flask.

The mixture is stirred and heated to 50° C. 20.4 g (0.12 mole) of isophoronediamine (CAS RN: 2855-13-2; molecular weight: 170.3) are added in the course of 30 minutes. The temperature of the reaction mixture is then maintained at about 85° C. for 24 hours.

The conversion of the cyclic carbonate functional group of the glycerol carbonate and the formation of the carbamate of isophoronediamine and glycerol are monitored by infra-red analysis.

0.243 g (7.8 10$^{-4}$ moles) of basic phosphazene catalyst P$_1$-t-Bu is then added to the reaction mixture to convert the carbamate diol that has formed into carbonate carbamate. The molar ratio catalyst/glycerol carbonate is 3.3 10$^{-3}$. The ratio by weight catalyst/glycerol carbonate is 0.88%. The reaction mixture is maintained at a temperature of 85° C. for about 2 hours, under reflux of the methyl carbonate. The methanol formed and a portion of the methyl carbonate are removed by evaporation. The reaction mixture is then left at ambient temperature (20° C.) for 20 hours.

Infra-red analysis carried out on the reaction mixture shows the presence of the cyclic carbonate band at 1792 cm$^{-1}$. The methanol and excess dimethyl carbonate are then evaporated off in vacuo using a rotary evaporator. 47 g of a mixture of carbamates of isophoronediamine and glycerol carbonate are then recovered.

The product is analyzed by the various $^1$H and $^{13}$C NMR techniques and by infra-red spectroscopy. These analyses confirm the formation of the urethane and cyclic carbonate functional groups.

The urethane of isophoronediamine and 4-hydroxymethyl-1,3-dioxolan-2-one is also confirmed by comparison with a sample obtained by reacting 1 equivalent of isophorone diisocyanate with 2 equivalents of glycerol carbonate (Jeffsol GC from Huntsman) in methoxypropyl acetate (Comparative Example 9).

Example 8

(According to the Invention): Synthesis of a Mixture of Diurethanes of Isophoronediamine and a Molecule Carrying Cyclic Carbonate Functional Groups by a Non-Isocyanate Method 80 g of methoxypropyl acetate, 46.5 g of glycerol carbonate and 32.5 g (0.19 mole) of isophoronediamine are added in succession, under nitrogen, to a reactor. The temperature of the mixture is brought to 70° C. and the reaction is stirred at 70° C. The disappearance of the carbonate functional groups is monitored by infra-red analysis (1790 cm$^{-1}$).

After 24 hours' stirring at 70° C., 171 g (1.9 moles) of dimethyl carbonate and 31.2 g of a 2% by weight solution of basic phosphazene catalyst $P_1$-t-Bu in hexane, i.e., 0.624 g of pure $P_1$-t-Bu phosphazene catalyst, i.e., 2 10$^{-3}$ moles of pure catalyst, are added to the reaction mixture, under nitrogen. The molar ratio [catalyst/urethanediol functional group] is therefore 5.25 10$^{-3}$.

The temperature of the reaction mixture is increased to 100° C. until the dimethyl carbonate is under reflux. The hexane, the catalyst solvent, is removed by distillation. The methanol formed in the reaction is removed by distillation with a portion of the methyl carbonate (methanol-methyl carbonate azeotrope).

The formation of the carbonate rings is monitored by infra-red spectroscopy at about 1780 cm$^{-1}$ (appearance of cyclic carbonate functional groups). After 8 hours' stirring at that temperature of 100° C., the reaction is stopped by lowering the temperature to ambient temperature.

The structure of the products formed is confirmed by NMR analysis directly on the reaction mixture. The urethanes of isophoronediamine and 4-hydroxymethyl-1,3-dioxolan-2-one and 5-hydroxy-1,3-dioxolan-2-one are present in the reaction mixture.

The urethane of isophoronediamine and 4-hydroxymethyl-1,3-dioxolan-2-one is also confirmed by comparison with a sample obtained by reacting 1 equivalent of isophorone diisocyanate with 2 equivalents of glycerol carbonate (Jeffsol GC from Huntsman) in methoxypropyl acetate (Comparison Example 9).

Example 9

(Comparative/does not Form Part of the Invention): Synthesis of the Diurethane of Isophoronediamine and Glycerol Carbonate By an Isocyanate Method 30 g of Highsolv P (Clariant solvent containing tetramethoxyethane), 17.5 g of glycerol carbonate (Jeffsol GC from Huntsman), 12.5 g of IPDI (isophorone diisocyanate) and 0.015 g of dibutyltin dilaurate are added in succession to a reactor. The reaction mixture is heated at 100° C. for 7 hours.

The resulting product is used to confirm the presence of the glycerol carbonate carbamate in the mixture of Examples 7 and 8.

Example 10

(According to the Invention): Synthesis of a Diurethane of Hexamethylenediamine Carrying Cyclic Carbonate Functional Groups, Obtained According to the Invention by a Non-Isocyanate Method 118 g (1 mole) of glycerol carbonate (Jeffsol GC) and 360 g (4 moles) of methyl carbonate are introduced in succession, under nitrogen, into a three-necked reactor equipped with a stirrer and a reflux column. 100 g of a 58% by weight methanolic solution of hexamethylenediamine (HMDA, i.e., 0.5 mole) are added to the reaction mixture in the course of 30 minutes. The reaction is exothermic. The temperature of the reaction mixture is maintained at 85° C. throughout the reaction.

After 2 hours' reaction, 10 g of a 20% by weight solution of basic phosphazene catalyst $P_1$-t-Bu in hexane, i.e., 2 g of pure $P_1$-t-Bu phosphazene catalyst, i.e., 6.4 10$^{-3}$ moles of pure catalyst, are added. The molar ratio catalyst/carbamate diol is 6.4 10$^{-3}$.

The temperature of the reaction mixture is increased to 100-110° C., so that the hexane, the methanol formed in the reaction and a portion of the methyl carbonate are removed by distillation.

After 8 hours' reaction, the reaction is stopped.

Example 11

(According to the Invention): Preparation of a Mixture of Diurethane of Hexamethylenediamine and a Molecule Carrying Cyclic Carbonate Functional Groups, Obtained According to the Invention by a Non-Isocyanate Method The procedure of Example 10 is followed, except that 236 g (2 moles) of diethyl carbonate are used instead of methyl carbonate and the temperature of the reaction mixture after addition of the catalyst is increased to 120° C.

Examples 12 to 14

According to the Invention

The procedure of Example 10 is followed, except that the amines used are those indicated in Table 2 below, the quantities of the reagents used for Example 13 are divided by 10, and the reaction time prior to addition of the catalyst is 8 hours at 85° C.

TABLE 2

| Ex. | Diamine | Quantity |
| --- | --- | --- |
| 12 | Tricyclodecanediamine (or 3(4),8(9)-bis-(aminomethyl)-tricyclo[5.2.1.10]decane; CAS RN: 68889-71-4; marketed by Celanese) | 97 g |
| 13 | Polyether diamine XTJ 548 from Huntsman | 80 g |
| 14 | $H_{12}$MDA (or bis-(4,4-aminocyclohexyl)methane; CAS RN: 1761-7-3) | 105 g |

Example 15

(According to the Invention): Synthesis of Polyhydroxy-Urethane Having Terminal Cyclic Carbonate Functional Groups 15-1: Preparation of a 50% by Weight Formulation of Diurethane of Isophoronediamine and Glycerol Carbonate:

302 g of Highlink W (solvent marketed by Clariant) are introduced into a 1-litre stirred reactor. 305 g of diurethane of isophoronediamine and glycerol carbonate, prepared by the procedure described in Example 7, are added to prepare 607 g of a 50% by weight diurethane solution.

15-2: Preparation of the Polyhydroxy-Urethane Having Terminal Cyclic Carbonate Functional Groups:

381.7 g of 50% by weight formulation of diurethane of isophoronediamine and glycerol carbonate (obtained in 15-1) are introduced into a 1-litre reactor. The mixture accordingly contains 1.145 moles of carbonate functional groups. 74 g of Highlink W (Celanese) are added. 25.4 g of hexamethylenediamine (0.214 mole) are added to the reaction mixture in the course of 30 minutes. The molar ratio {primary amine/carbonate functional group} is 0.37. The reaction is exothermic. The temperature of the reaction mixture is maintained at 70° C. for 8 hours.

Example 16

Preparation of an Aqueous Lysine Formulation

An aqueous solution of lysine sodium salt is prepared by the following procedure.

140 g of 1 M sodium hydroxide are introduced into a stirred reactor. 20 g of lysine are then added, with stirring. When the lysine has dissolved completely, a solution of lysine sodium salt is obtained and is used to prepare the aqueous polyhydroxy-urethane formulation.

This lysine solution will be used to prepare aqueous polyhydroxy-urethane formulations.

Example 17

(According to the Invention): Synthesis of an Aqueous Polyhydroxy-Urethane Formulation 50 g of formulation of Example 15-1 of diurethane of isophoronediamine and glycerol carbonate, prepared by the procedure described in Example 7, are introduced into a reactor. The number of moles of carbonate functional groups in the formulation is 0.11.

64 g of lysine solution from Example 16 (i.e., 0.11 mole of amine functional groups) are then added at ambient temperature. The molar ratio primary amine functional groups/cyclic carbonate functional groups is 1.

The reaction mixture is then heated to 85° C. and stirred for 6 hours. Monitoring by infra-red analysis shows the disappearance of the carbonate functional groups.

An aqueous formulation of polyhydroxy-urethane carrying sodium carboxylate functional groups is obtained.

Examples 18 and 19

(According to the Invention): Examples of Syntheses of Aqueous Polyhydroxy-Urethane Formulations The procedure of Example 17 is followed, except that hexamethylenediamine is added to the reaction mixture immediately after the lysine solution has been introduced.

The characteristics of each of the formulations are compiled in Table 3 below.

TABLE 3

| Example | Quantity of diurethane formulation of Ex. 15-1 (grams) | Quantity of lysine solution (grams) | Quantity of hexamethyl-enediamine (grams) | Molar ratio NH₂ functional groups/carbonate functional groups |
|---|---|---|---|---|
| 18 | 50.2 | 48.5 | 1.6 | 1 |
| 19 | 50.1 | 32.2 | 3.16 | 1 |

These examples show that aqueous polyhydroxy-urethane formulations are obtained by conducting the reaction in a hydro-organic medium.

These formulations are used to produce polyurethane films.

Examples 20 to 23

Examples of Preparations of Polyurethane Compositions for Coatings

The aqueous polyhydroxy-urethane formulations of Examples 17, 18 and 19 are formulated with Rhodocoat® water-dispersible polyisocyanate curing agents based on hexamethylene diisocyanate. Rhodocoat® XWT 2104 is used as polyisocyanate curing agent. For Example 22, the solids content of the final formulation is adjusted by addition of water. The resulting formulations are applied to sheets of glass and allowed to dry for 30 minutes at ambient temperature and then for 2 hours at 60° C.

The characteristics of the resulting formulations are summarized in Table 4 below:

TABLE 4

| Ex. | Quantity of aqueous diurethane formulation Ex. 17 (number of moles of OH) | Quantity of aqueous diurethane formulation Ex. 18 (number of moles of OH) | Quantity of aqueous diurethane formulation Ex. 19 (number of moles of OH) | Quantity of Rhodocoat ® WT 2104 (grams) | Ratio NCO/OH | Solids content of the final formulation in % |
|---|---|---|---|---|---|---|
| 20 | 11.5 g (0.011 mol OH) | | | 2.02 | 1.05 | 33.8 |
| 21 | | 10 g (0.011 mol OH) | | 2.06 | 1.05 | 41.6 |
| 22 | | | 8.6 g (0.011 mol OH) | 1.95 | 1.2 | 30.3* |

*addition of 5 ml of water

Formulations 20 and 21 yield opaque polyurethane films after drying. Formulation 22 yields a transparent film.

These examples show that the aqueous polyhydroxy-urethane formulations yield polyurethane networks by crosslinking with water-dispersible polyisocyanates.

Optimization of the formulations allows the properties to be adjusted to the required specifications.

Example 24

(According to the Invention): Example of the Synthesis of an Aqueous Polyhydroxy-Urethane Suspension 26 g of formulation of Example 15-1 of diurethane of isophoronediamine and glycerol carbonate, prepared by the procedure described in Example 7, are introduced into a reactor. 40 g of ethanol are added to the reaction mixture, then 3.7 g of Surfonamine L 100 (monoalkyl polyether having a primary amine functional group, marketed by Huntsman) are added to the reaction mixture. The molar ratio {amine functional groups/carbonate functional groups} is 0.33. After one night at ambient temperature, the solvent is evaporated off in vacuo.

After addition of 30 g of water to the reaction mixture, a polyhydroxy-urethane suspension is obtained.

Example 25

(According to the Invention): Synthesis of an Aqueous Formulation of Polyhydroxy-Urethane Having Sulfonate Functional Groups In a first stage, an aqueous solution of triethylamine N-cyclohexylaminopropanesulfonate salt is prepared by the following procedure:

There are added to a reactor in succession, with stirring:
40.5 g of distilled water;
10 g of triethylamine;
21.8 g of N-cyclohexylaminopropanesulfonic acid;
The resulting solution is homogeneous.

There are added to a reactor in succession:
4.2 g of formulation of Example 15-1 of diurethane of isophoronediamine and glycerol carbonate, prepared by the procedure described in Example 7;
0.6 g of hexamethylenediamine;
3.6 g of isopropanol
4.3 g of aqueous solution of triethylamine N-cyclohexylaminopropanesulfonate salt prepared as above.

The ratio {amine functional groups/carbonate functional groups} is 1.

The reaction is stirred at 70° C. for 18 hours. The absence of carbonate functional groups is confirmed by infra-red analysis. The reaction mixture is allowed to cool to 20° C. to give a homogeneous hydro-organic solution of polyhydroxy-urethane containing triethylaminesulfonate functional groups.

Example 26

(According to the Invention): Synthesis of an Aqueous Polyhydroxy-Urethane Formulation Containing a Polyhydroxy-Urethane Having Terminal Primary Amine Functional Groups There are introduced into a stirred reactor in succession:
102 g of formulation of Example 15-1 of diurethane of isophoronediamine and glycerol carbonate, prepared by the procedure described in Example 7;
8.5 g of hexamethylenediamine (HMDA);
86.6 g of lysine sodium salt solution (prepared from 11.77 g of lysine and 83.9 g of 1 M sodium hydroxide).

The molar ratio {primary amine functional groups/carbonate functional groups} is 1.32. The ratio {HMDA primary amines/lysine primary amines} is 1.

The temperature of the reaction mixture is brought to 70° C. The reaction mixture is stirred for 4 hours. The disappearance of the carbonate functional groups is monitored by infrared spectroscopic analysis. There is obtained a homogeneous final formulation of polyhydroxy-urethane, the solids content of which is 35.6%.

Polyhydroxy-urethane solubility test:

3.1 g of formulation are removed and introduced into a 20 ml glass tube. A 0.1 N HCl solution is added to neutralize the carboxylate functional groups. After addition of 1.5 ml of HCl solution, the appearance of a precipitate is observed.

14 g of the resulting formulation are then mixed quickly with 4.95 g of Rhodocoat® WT 2102 (water-dispersible polyisocyanate based on HDI isocyanurate, marketed by Rhodia) and then applied quickly to a sheet of glass to give a polyurethane coating.

Example 27

(According to the Invention): Example of the Preparation of a Coating from an Aqueous Formulation Containing a Polyhydroxy-Urethane Carrying Sulfonate Functional Groups 27-1: Preparation of a Hydro-Organic Solution of the Triethylamine Salt of N-Cyclohexylaminopropanesulfonic Acid:

346 g of Highlink W (solvent marketed by Clariant), 610 g of distilled water, 105 g of N-cyclohexylaminopropanesulfonic acid and 48 g of triethylamine are introduced, in succession, into a reactor.

Stirring is carried out for 30 minutes at ambient temperature.

27-2: Preparation of a Hydro-Organic Formulation of Polyhydroxy-Urethane Having Pendant Sulfonate Functional Groups:

105 g of a solution, having a solids content of 55%, of diurethane of isophoronediamine and glycerol carbonate in Highlink W, prepared as described in Example 15-1, are introduced into a reactor. 20.2 g of Highlink W, 9 g of HMDA are added in succession. The molar ratio HMDA primary amine/carbonate functional groups is 0.5. The temperature of the reaction mixture is brought to 60° C. Stirring is carried out for 3 hours. The measurement of the content of hydroxyl functional groups in the polyhydroxy-urethane so formed is 1.0815 moles of OH/kg dry.

365 g of hydro-organic solution of the triethylamine salt of N-cyclohexylaminopropanesulfonic acid are added, and stirring is carried out for 3 hours at 70° C. and 16 hours at ambient temperature.

27-3: Preparation of a Polyurethane Coating from the Hydro-Organic Formulation of Example 27.2:

173 g of polyhydroxy-urethane formulation of Example 27-2 and 21.6 g of Rhodocoat XEZM 501 (water-dispersible polyisocyanate from Rhodia having an NCO content of 0.514 mole/100 g, i.e., 21.58% by weight) are added, in succession, to a reactor. The ratio NCO/OH is of the order of 1.1. The mixture is stirred slowly manually with a glass rod to give a fluid formulation having a solids content of 32%.

The formulation is then applied to a sheet of glass (thickness of the moist film: 200 µm). The film so formed is dried in an oven at 60° C. for 2 hours and then left at ambient temperature for 24 hours.

There is obtained a PU film of matt appearance having a Persoz hardness of 165 after 7 days.

Example 28

Example of the Preparation of a Coating from a Solvent-Borne Formulation Containing a Polyhydroxy-Urethane Composition of the Invention and an HDI Isocyanurate Polyisocyanate The object of this example is to show that the solvent-borne (organic solvent medium) polyhydroxy-urethane formulations of the invention can yield polyurethane coatings by reaction with polyisocyanate curing agents.

28-1: Preparation of the Polyhydroxy-Urethane Formulation:

105 g of formulation of Example 15-1 (50% formulation of diurethane of isophoronediamine and glycerol carbonate in Highlink W) are introduced into a 250 ml reactor equipped with a stirrer. The number of moles of carbonate functional groups in the reaction mixture is 0.23. The temperature of the reaction mixture is brought to 35° C. 13.3 g of HMDA (0.115 mole) are then added in the course of 10 minutes. The molar ratio $NH_2$ functional groups/cyclic carbonate functional groups is 1. The temperature of the reaction mixture is brought to 70° C. and the mixture is stirred for 5 hours.

The formulation is then stored at ambient temperature. 39.4 g of dimethyl sulfoxide (DMSO) are added to bring the solids content of the formulation to 42% to reduce the viscosity of the reaction mixture. The content of hydroxyl functional groups is 0.144 mole per 100 g.

28-2: Production of a Polyurethane Coating in Organic Phase:

7.34 g of polyhydroxy-urethane formulation of Example 28-1 are mixed with 2.05 g of Tolonate HDT LV2 (low-viscosity polyisocyanate from Rhodia based on HDI isocyanurate and having an isocyanate functional group content of 23% by weight) and 1.98 g of DMSO.

The coating formulation so prepared is then applied to a sheet of glass (thickness of the moist film: 200 µm). The film is then dried for 1 hour at 60° C. and is then left at ambient temperature.

A transparent and smooth polyurethane coating is obtained (the Persoz hardness of which cannot be measured because the pendulum slides).

Example 29

Preparation of a Polyhydroxy-Urethane Composition of the Invention

A cyclic carbonate precursor compound is used to prepare a polyhydroxy-urethane composition.

8.35 g of glycerol (0.0906 mole), 16.35 g of methyl carbonate (0.182 mole), 0.13 g of phosphazene base catalyst $P_1$-t-Bu (4 $10^{-4}$ mole) and 2.59 g of hexamethylenediamine (HMDA; 0.045 mole) are added in succession to a closed 50 ml reactor. The mixture is stirred at 100° C. and the progress of the reaction is monitored by infra-red analysis.

After one night's reaction, the temperature of the reaction mixture is brought to ambient temperature. The reaction mixture is analyzed by infra-red (IR) spectroscopy and proton nuclear magnetic resonance (NMR). These analyses confirm the formation of urethane, cyclic carbonate functional groups and the presence of hydroxy-urethane functional groups.

There is thus obtained a composition which contains diurethane of hexamethylenediamine and glycerol carbonate, polyhydroxy-urethanes of hexamethylenediamine and glycerol carbonate and the terminal functional groups of which are urethanes of cyclic carbonates, methyl carbonate and methanol.

Example 30

(According to the Invention): Preparation of a Hydro-Organic Formulation of a Polyhydroxy-Urethane Having Pendant Hydroxyl Functional Groups and Carrying Amine Functional Groups The object of this example is to show that it is possible to obtain polyhydroxy-urethane formulations having amine functional groups, preferably secondary amine functional groups, some of which are converted into a salt with a strong acid to give a solution or dispersion in aqueous or hydro-organic phase, by using the selectivity of the reaction of opening of the cyclic carbonate functional groups by the primary amines relative to the secondary amines.

30-1: Preparation of a Polyhydroxy-Urethane Having Pendant Hydroxyl Functional Groups and Having Terminal Amine Functional Groups:

In a first stage, a polyhydroxy-urethane having pendant hydroxyl functional groups and having amine functional groups, preferably secondary amine functional groups, in the structure and terminal amines is prepared.

An 84% by weight solution of the product of Example 7 (25.4 g/0.055 mole) in HighSolv™ Solvent Clariant containing tetramethoxyethane (4.7 g) is prepared.

30.24 g of that solution are added to a 250 ml flask, and then 7.4 g (about 0.034 mole) of bis-(6-amino-hexamethylene)-imine from Fluka (MW=215) and 37.6 g of Jeffamine HT1100™ (about 0.034 mol) are added in succession. The molar ratio cyclic carbonate functional groups/primary amine functional groups is about 81%. The molar ratio secondary amine functional groups/primary amines is 29%. 25 g of HighSolvP are added. The mixture is stirred at about 50° C. After 8 hours' reaction, the disappearance of the carbonate band is observed by infra-red (1798 $cm^{-1}$).

Potentiometric analysis of the amine functional groups by triflic acid in an acetic acid medium gives a total basicity (sum of the primary and secondary amines) of 0.54 milliequivalents per gram for an expected theoretical value of 0.57 meq/g. The quantity of hydroxyl functional groups obtained by assay gives a total quantity of 0.95 meq/g for an expected theoretical value of 1.05.

Analysis of the hydroxyl functional groups is carried out by difference of the total of the acetylable functional groups (amine and hydroxyl functional groups) and the amine functional groups obtained by potentiometric analysis (see above). The method of analyzing the acetylable functional groups is identical with the method of analyzing the hydroxyl functional groups of the polyols known to one skilled in the art.

30-2: Preparation of Hydro-Organic Formulations of Polyhydroxy-Urethane in which Some of the Amine Functional Groups are Converted into a Salt:

B1 to B4/Neutralization of the Amine Functional Groups by Hydrochloric Acid:

5 g of formulation obtained in step 31.1, 1.5 ml of a 1 N HCl solution in isopropanol, and 2.13 g of water are added in succession to a 50 ml reactor. The reaction mixture is stirred vigorously. A milky solution of polyhydroxy-urethane hydrochloride is obtained.

The following examples show that the increasing conversion of the amine functional groups into a salt allows solutions of polyhydroxy-urethane hydrochloride to be obtained.

| Test | Formulation 31.1 in g | 1N HCl/ 2-propanol in ml | Water in g | pH of the formulation | Ratio amines/HCl | Observation |
|---|---|---|---|---|---|---|
| B1 | 5 | 1.5 | 2.13 | 7.7 | 1.15 | Milky emulsion |
| B2 | 5 | 1.5 | 3.85 | 7.7 | 1.15 | Milky emulsion |
| B3 | 2.9 | 1.65 | 2.9 | 7.5 | 0.65 | Solution |
| B4 | 3.5 | 1.65 | 3 | 7.6 | 0.78 | Solution |

B5 to B7/Neutralization of the Amine Functional Groups by Acetic Acid:

| Test | Formulation 31.1 in g | Acetic acid in g | Water in g | Observation |
|---|---|---|---|---|
| B5 | 5 | 0.2 | 0.7 | Milky emulsion |
| B6 | 5 | 0.4 | 5 | Solution |

Example 31

(According to the Invention): Preparation of Coatings from the Formulations of Example 30

A polyurethane coating is prepared from hydro-organic formulations obtained according to Example 30 and a hydrophobic or hydrophilic polyisocyanate curing agent.

Example 31A

The hydrophobic polyisocyanate curing agent used is TOLONATE HDT LV2, which is a low-viscosity polyisocyanate (about 700 mPas at 25° C.) based on hexamethylene diisocyanate and having isocyanurate and uretidinedione functional groups, marketed by RHODIA. The isocyanate content of this polyisocyanate curing agent is about 23% by weight.

5.5 g of a formulation of Example 30.1 are introduced into a beaker; a 1 N HCl solution in isopropanol (2.2 ml) and 0.2 ml of acetic acid are added, and then 4 ml of water and 2 ml of HighSolvP. The whole is mixed and then 0.68 g of TOLONATE HDT LV2 is added. The molar ratio NCO functional groups/OH functional groups is 1.9. The mixture is quickly stirred vigorously to homogenize it, and the formulation is quickly applied to a sheet of glass. The pot life of the formulation is very short (10 minutes) and it is important to apply the formulation to the substrate quickly. The coating is allowed to crosslink under an atmosphere of controlled humidity and at ambient temperature. The resulting film dries quickly (touch-dry after 1 hour). The film obtained after drying has good properties.

Example 31B

The hydrophilic polyisocyanate curing agent used is RHODOCOAT EZ M 502, which is a polyisocyanate having a viscosity of about 3600 mPas at 25° C., based on hexamethylene diisocyanate and having isocyanurate and uretidinedione functional groups, marketed by RHODIA. The isocyanate content of this polyisocyanate curing agent is about 18.4% by weight.

9 g of a formulation of Example 30.1 are introduced into a beaker; 3 ml of HighSolvP are added, then 9 g of water and 3 ml of acetic acid. A solution of polyhydroxy-urethane is obtained, to which 1 g of RHODOCOAT EZM 502 is added. The molar ratio NCO functional groups/OH functional groups is 1.5. The mixture is quickly stirred vigorously to homogenize it, and the formulation is quickly applied to a sheet of glass.

The coating is allowed to crosslink under an atmosphere of controlled humidity and at ambient temperature.

An opaque film which dries quickly is obtained.

Example 32

(According to the Invention): Preparation of a Hydro-Organic Formulation of a Polyhydroxy-Urethane Having Pendant Hydroxyl Functional Groups and Pendant Carboxylate Functional Groups Converted into a Salt The object of this example is to show that it is possible to obtain a hydro-organic polyhydroxy-urethane formulation by reacting some of the pendant hydroxyl functional groups with a cyclic carboxylic anhydride which, after reaction, yields acid ester functional groups which are converted into a salt with a tertiary amine.

The formulation so obtained allows polyhydroxy-urethane formulations that are dispersible in water or in a hydro-organic medium to be obtained. The cyclic carboxylic anhydride is succinic acid.

32-1: Preparation of the Polyhydroxy-Urethane Carrying Pendant Hydroxyl Functional Groups:

A diurethane having terminal glycerol carbonate functional groups is prepared as follows. 830 g of hexamethylene diisocyanate (HDI), 83 g of hydroxypivalyl hydroxypivalate (also called 3-hydroxy-2,2-dimethylpropyl 3-hydroxy-2,2-dimethylpropionate (product marketed by Eastmann Chemical, RN CAS 1115-20-4) are introduced in succession, under a stream of nitrogen, into a 1-litre double-walled reactor equipped with a stirrer and a condenser. The reaction mixture is then stirred and the temperature of the reaction mixture is fixed at 100° C. The NCO content of the starting reaction mixture is 1.08 moles of NCO per 100 g, i.e., 45.4% by weight. After 4 hours' reaction, the reaction mixture is distilled in vacuo on an evaporator with a scraping wire, at a temperature of 160° C. and in vacuo (0.2 mm Hg). After removal of the excess HDI monomer, the amount of diurethane recovered is 197 g.

190 g of this diurethane are then added, under a stream of nitrogen, to a 500 ml double-walled reactor and reacted with 84 g of glycerol carbonate.

The temperature of the reaction mixture is brought to 100° C. and the reaction mixture is stirred for 5 hours. The complete disappearance of the isocyanate functional groups is observed. 274 g of diurethane having terminal glycerol carbonate functional groups are obtained.

30 g of this mixture are removed and introduced, under nitrogen, into a 250 ml reactor. 3 g of hexamethylenediamine and 22 g of polyamide ester CAPA 606036 from SOLVAY (polycaprolactone having terminal primary amine functional groups) are added to the reaction mixture and stirring is carried out for 4 hours at 80° C. The molar ratio of primary amine functional groups to cyclic carbonate functional groups is 1.52 g of polymer are obtained.

32.2: Preparation of a Formulation of Polyhydroxy-Urethane Carrying Pendant Hydroxyl Functional Groups and Having Pendant Carboxylate Functional Groups Converted into a Salt:

18.6 g of polymer of Example 32.1 are introduced into a 100 ml reactor. The temperature of the reaction mixture is brought to 100° C., and 0.85 g of succinic anhydride is added. After 1 hour's reaction, 33% of the hydroxyl functional groups are thus converted to acid ester functional groups. 1.11 g of N,N-dimethylcyclohexylamine are added to the reaction mixture to convert the pendant carboxylic functional groups into a salt. The product is recovered while hot and is then allowed to cool to give a solid product at room temperature.

10 g of solid product are introduced into a beaker, and 10 g of N-methyl-pyrrolidone are added to dissolve the polymer. The temperature of the mixture is brought to 50° C. to assist the dissolution. When dissolution is complete, the mixture is allowed to cool to ambient temperature and 4 ml of water are added to the reaction mixture to give a hydro-organic solution of polyhydroxy-urethane having pendant hydroxyl functional groups and pendant carboxylic functional groups converted into a salt.

Example 33

(According to the Invention): Preparation of a Hydro-Organic Formulation of a Polyhydroxy-Urethane Amide Having Pendant Hydroxyl Functional Groups and Carboxylate Functional Groups Converted into a Salt A starting polyhydroxy-urethane carrying secondary amine functional groups in the skeleton and pendant hydroxyl functional groups, as described in Example 30.1, is used.

In contrast to Example 32, the amine functional groups react with the cyclic anhydride rather than the pendant hydroxyl functional groups, and acid amide functional groups are thus obtained, which can then be converted into a salt with tertiary amines to give polyhydroxy-urethane amides which are dispersible in water or in a hydro-organic solvent.

50 g of a polyhydroxy-urethane prepared as described in Example 30.1 are introduced into a 100 ml double-walled reactor equipped with a stirrer. The temperature of the reaction mixture is brought to 80° C., and 2.5 g of succinic anhydride are added. After 1 hour's reaction, the temperature of the reaction mixture is allowed to return to ambient temperature, and 3 g of N,N-dimethylcyclohexylamine are added to convert the carboxylic acid functional groups into a salt.

5 ml of N-methylpyrrolidone and 2.5 ml of water are then added to 10 g of the resulting mixture to give a hydro-organic formulation of polyhydroxy-urethane having pendant hydroxyl functional groups and having pendant acid amide functional groups converted into a salt.

Each patent, patent application, publication, text and literature article/report cited or indicated herein is hereby expressly incorporated by reference in its entirety.

While the invention has been described in terms of various specific and preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A method for preparing a compound (U) having at least one urethane group and at least one hydroxyl functional group, said method comprising reacting:

a) at least one compound (1) having a cyclic carbonate functional group and at least one hydroxyl functional group, wherein the oxygen atom of the hydroxyl group is separated from the carbon atom of the carbonyl group of said cyclic carbonate by from 3 to 5 atoms;

b) at least one compound (2) having at least one linear carbonate functional group;

c) at least one compound (3) having at least one primary or secondary amine functional group; and d) optionally at least one catalyst (4)

optionally in the presence of a solvent, and optionally followed by removal of said solvent and/or of co-products of the reaction, wherein compounds (1), (2) and (3) are brought into contact and then optionally the catalyst (4) is added.

2. The method according to claim 1, in which said at least one hydroxyl functional group of said compound (U) is located in the β- or γ-position of said at least one urethane functional group.

3. The method according to claim 1, in which said compound (U) having at least one urethane group and at least one hydroxyl functional group is a polyhydroxy-urethane.

4. The method according to claim 1, in which compound (1) is a polyol carbonate.

5. The method according to claim 1, in which the boiling point of compound (2) is from 80° C. to 280° C. at atmospheric pressure (1013.25 hPa).

6. The method according to claim 1, in which compound (2) has the general formula (a) below:

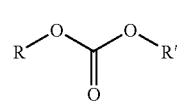

(a)

in which:

R and R', which are identical or different, each represents a linear or branched alkyl radical having from 1 to 6 carbon atoms, wherein each alkyl radical is optionally substituted by at least one cyclic carbonate.

7. The method according to claim 1, in which compound (2) has the general formula (a):

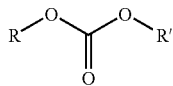

in which:
R and R', which are identical or different, each represents a linear or branched alkyl radical having from 1 to 6 carbon atoms or a linear or branched alkyl radical having from 1 to 6 carbon atoms substituted by at least one cyclic carbonate group, with the proviso that R and/or R' has (have) at least one cyclic carbonate group.

8. The method according to claim 1, in which compound (2) is selected from the group consisting of dimethyl carbonate, diethyl carbonate, and mixtures thereof.

9. The method according to claim 1, in which compound (3) comprises one or more other functional groups selected from the group consisting of ether, urethane, amide, hydroxyl, thiol, carboxyl and an ionic functional group, and a mixture thereof.

10. The method according to claim 1, in which compound (3) is selected from the group consisting of:
primary or secondary monoamines, having a linear, branched or cyclic chain, optionally containing one or more unsaturated bonds, and having from 1 to 20 carbon atoms;
primary or secondary monoamines, having a linear, branched or cyclic chain, optionally containing one or more unsaturated bonds, and having from 1 to 20 carbon atoms, and having one or more ionic functional groups, and/or having one or more functional groups selected from —OH, —SH and ether;
polyether monoamines, which can also have one or more ionic functional groups, and/or one or more functional groups selected from —OH, —SH;
aliphatic or cycloaliphatic diamines;
aliphatic or cycloaliphatic diamines;
aromatic diamines;
diamines having ionic functional group(s); and
oligomers and polymers having at least two amine functional groups.

11. The method according to claim 1, in which compound (3) is selected from the group consisting of di-, tri- or tetra-functional polyether amines and polyoxyalkyleneamines, in which the alkylene structural unit is linear or branched, and mixtures thereof.

12. The method according to claim 1, in which the solvent is methoxypropyl acetate, N-methylpyrrolidone, dimethyl sulfoxide, an alcohol or an acetal.

13. The method of claim 10, wherein the polymer having at least two amine functional groups is a polyamide, a polyether, a polyester, a polyurethane or copolymers thereof.

14. A method for preparing a compound (U) having at least one urethane group and at least one hydroxyl functional group, said method comprising reacting:
a) at least one compound (1) having a cyclic carbonate functional group and at least one hydroxyl (—OH) functional group, wherein the oxygen atom of the hydroxyl group is separated from the carbon atom of the carbonyl group of said cyclic carbonate by from 3 to 5 atoms;
b) at least one compound (2) carrying at least one linear carbonate functional group;
c) at least one compound (3) carrying at least one primary or secondary amine functional group; and
d) at least one catalyst (4);
optionally in the presence of a solvent, and optionally followed by removal of said solvent and/or of co-products of the reaction,
wherein the reaction is carried out in a single step by simultaneously bringing the totality of compounds (1), (2) and (3) into contact with the catalyst (4).

15. The method of claim 1, wherein compound (U) is an oligomer or a polymer.

16. The method of claim 14, wherein compound (U) is an oligomer or a polymer.

17. The method according to claim 14, in which said at least one hydroxyl functional group of said compound (U) is located in the β- or γ-position of said at least one urethane functional group.

18. The method according to claim 14, in which said compound (U) having at least one urethane group and at least one hydroxyl functional group is a polyhydroxy-urethane.

19. The method according to claim 14, in which compound (1) is a polyol carbonate.

20. The method according to claim 14, in which the boiling point of compound (2) is from 80° C. to 280° C. at atmospheric pressure (1013.25 hPa).

21. The method according to claim 14, in which compound (2) has the general formula (a) below:

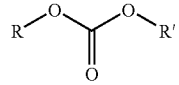

in which:
R and R', which are identical or different, each represents a linear or branched alkyl radical having from 1 to 6 carbon atoms, wherein each alkyl radical is optionally substituted by at least one cyclic carbonate.

22. The method according to claim 14, in which compound (2) has the general formula (a):

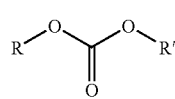

in which:
R and R', which are identical or different, each represents a linear or branched alkyl radical having from 1 to 6 carbon atoms or a linear or branched alkyl radical having from 1 to 6 carbon atoms substituted by at least one cyclic carbonate group, with the proviso that R and/or R' has (have) at least one cyclic carbonate group.

23. The method according to claim 14, in which compound (2) is selected from the group consisting of dimethyl carbonate, diethyl carbonate, and mixtures thereof.

24. The method according to claim 14, in which compound (3) comprises one or more other functional groups selected from the group consisting of ether, urethane, amide, hydroxyl, thiol, carboxyl and an ionic functional group, and a mixture thereof.

25. The method according to claim 14, in which compound (3) is selected from the group consisting of:
- primary or secondary monoamines, having a linear, branched or cyclic chain, optionally containing one or more unsaturated bonds, and having from 1 to 20 carbon atoms;
- primary or secondary monoamines, having a linear, branched or cyclic chain, optionally containing one or more unsaturated bonds, and having from 1 to 20 carbon atoms, and having one or more ionic functional groups, and/or having one or more functional groups selected from —OH, —SH and ether;
- polyether monoamines, which can also have one or more ionic functional groups, and/or one or more functional groups selected from —OH, —SH;
- aliphatic or cycloaliphatic diamines;
- aliphatic or cycloaliphatic diamines;
- aromatic diamines;
- diamines having ionic functional group(s); and
- oligomers and polymers having at least two amine functional groups.

26. The method according to claim 14, in which compound (3) is selected from the group consisting of di-, tri- or tetrafunctional polyether amines and polyoxyalkyleneamines, in which the alkylene structural unit is linear or branched, and mixtures thereof.

27. The method according to claim 14, in which the solvent is methoxypropyl acetate, N-methylpyrrolidone, dimethyl sulfoxide, an alcohol or an acetal.

28. The method of claim 26, wherein the polymer having at least two amine functional groups is a polyamide, a polyether, a polyester, a polyurethane or copolymers thereof.

* * * * *